US008612639B1

(12) United States Patent
Righi et al.

(10) Patent No.: US 8,612,639 B1
(45) Date of Patent: Dec. 17, 2013

(54) METHODS AND SYSTEMS FOR EMULATING FAILED AIRCRAFT UNITS ACROSS MULTIPLE COMMUNICATIONS BUS SOURCES

(75) Inventors: Luigi P. Righi, Laguna Hills, CA (US); Mark A. Talbot, Huntington Beach, CA (US); Gregory M. Wellbrook, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 12/939,253

(22) Filed: Nov. 4, 2010

(51) Int. Cl.
*G06F 3/00* (2006.01)
*H04N 7/18* (2006.01)

(52) U.S. Cl.
USPC ............... 710/15; 710/9; 710/17; 725/76

(58) Field of Classification Search
USPC ................... 710/9, 15, 17; 725/76
See application file for complete search history.

(56) References Cited

U.S. PATENT DOCUMENTS

| 3,569,632 | A  | * | 3/1971  | Beresin et al. ............. 370/509 |
| 6,108,300 | A  | * | 8/2000  | Coile et al. ............... 370/217 |
| 6,782,392 | B1 | * | 8/2004  | Weinberger et al. ............. 1/1 |
| 7,356,336 | B2 |   | 4/2008  | Perez et al. |
| 7,599,305 | B2 |   | 10/2009 | Bui |
| 2003/0223466 | A1 | * | 12/2003 | Noronha et al. ............. 370/537 |
| 2004/0268175 | A1 | * | 12/2004 | Koch et al. ............... 714/4 |
| 2007/0027589 | A1 | * | 2/2007  | Brinkley et al. ............. 701/3 |
| 2010/0033350 | A1 | * | 2/2010  | Papineau et al. ............. 340/967 |

* cited by examiner

*Primary Examiner* — Farley Abad
(74) *Attorney, Agent, or Firm* — Armstrong Teasdale LLP

(57) ABSTRACT

A method for providing a backup capability for a plurality of units communicatively coupled to a communications bus, each unit assigned a unique address on the communications bus, is described. The method includes monitoring, with a monitoring unit, messages on the communications bus for an indication that at least one of the communicatively coupled units has failed, configuring the monitoring unit, upon receiving the indication of a unit failure, to assume the unique address associated with the failed unit, performing, within the monitoring unit, at least a portion of the functions of the failed unit in response to messages occurring on the communications bus that are addressed to the failed unit, and transmitting messages, from the monitoring unit to the communications bus, the messages including data generated by the performing of at least a portion of the functions of the failed unit by the monitoring unit.

18 Claims, 6 Drawing Sheets

METHODS AND SYSTEMS FOR EMULATING FAILED AIRCRAFT UNITS ACROSS MULTIPLE COMMUNICATIONS BUS SOURCES

BACKGROUND

The field of the disclosure relates generally to providing backup redundancy in a dynamically multi-configurable line replaceable unit, and more specifically, to methods and systems for emulating failed aircraft units across multiple communications bus sources.

Modern aircraft are configured with a multitude of systems. Many of these systems communicate to one another via communications buses. Generally, operation of one such system is somewhat dependent on data generated via operation of another such system. Such systems include, navigation, fuel monitoring, altitude sensors, communications, radar, autopilot, and in the case of military aircraft, various weapons and defense systems to name a very few. Such systems are generally made up of one or more components that operate together as a system and are typically programmed to provide the flight crew with one or more displays that provide status, and allow for flight crew input. As is easily understood, pilots are dependent on the data received on such displays for operation of the aircraft and for other aspects of a mission being performed via the aircraft, such as delivery of a payload and gathering of data.

The various components of such systems are often referred to as "line-replaceable-units" (LRUs). One type of LRU is a highly complex module often incorporating several processors for controlling and/or monitoring one or more components or subassemblies of an aircraft. Other LRUs are simple, such a mechanical device that outputs a signal based on a position of an engine nozzle. Certain LRUs may be provided to monitor and/or control one or more external devices such as an actuator, valve, motor, etc., associated with a particular component or assembly of the aircraft. An LRU typically also generates output signals which can be monitored to determine if the LRU and/or the component with which it is associated is not operating properly.

The various displays of an aircraft are also considered to be LRUs. Certain systems, for example, a navigation system may include several LRUs one of which is a dedicated display. A multi-function display may display navigation related data, as well as data from other systems, the data being displayed selectable by the pilot. Depending on a configuration of an avionics suite, one or both of the dedicated display and the multi-function display may communicate via one of the afore-mentioned communications buses.

BRIEF DESCRIPTION

In one aspect, a method for providing a backup capability for a plurality of units communicatively coupled to a communications bus, each unit assigned a unique address on the communications bus, is provided. The method includes monitoring, with a monitoring unit, messages on the communications bus for an indication that at least one of the communicatively coupled units has failed, configuring the monitoring unit, upon receiving the indication of a unit failure, to assume the unique address associated with the failed unit, performing, within the monitoring unit, at least a portion of the functions of the failed unit in response to messages occurring on the communications bus that are addressed to the failed unit, and transmitting messages, from the monitoring unit to the communications bus, the messages including data generated by the performing of at least a portion of the functions of the failed unit by the monitoring unit.

In another aspect, a monitoring unit is provided that includes a first communications bus interface for receiving messages associated with a plurality of units communicatively coupled to a first communications bus, and a processing device programmed to determine, from the received messages associated with the plurality of units, whether one or more of the plurality of units have failed. The processing device is further programmed to configure the monitoring unit to assume the unique address associated with the failed unit, perform at least a portion of the functions of the failed unit in response to messages occurring on the first communications bus that are addressed to the failed unit, and cause messages to be transmitted by said monitoring unit onto the first communications bus via said first communications bus interface, the messages including data generated by the performing of at least a portion of the functions of the failed unit by said monitoring unit.

In still another aspect, a monitoring unit is provided that includes a first communications bus interface for receiving messages associated with a plurality of units communicatively coupled to a first communications bus, a processing device programmed to determine, from the received messages associated with the plurality of units, whether one or more of the plurality of units have failed, and a memory comprising operational programs stored therein, the operational programs associated with the plurality of units. The processing device is further programmed to configure, upon determining a unit has failed, the monitoring unit to assume the unique address associated with the failed unit, execute an operational program associated with the failed unit such that the monitoring unit performs at least a portion of the functions of the failed unit, responds to messages occurring on the first communications bus that are addressed to the failed unit, and cause messages to be transmitted by the monitoring unit onto the first communications bus via the first communications bus interface, the messages including data generated by the execution of the operational program associated with the failed unit by the monitoring unit.

The features, functions, and advantages that have been discussed can be achieved independently in various embodiments or may be combined in yet other embodiments further details of which can be seen with reference to the following description and drawings.

DETAILED DESCRIPTION

Many of the line replaceable units (LRUs) in a modern aircraft communicate data to one another over one or more communications buses. A suite of LRUs and their supporting components, including multi-function and dedicated displays may be referred to as a system of systems. As indicated, a system of systems can contain multiple communications buses and the communications between the various components (LRUs) over such buses may include thousands of parameters across the various messages that the LRUs provide to one another. Certain of these parameters are directed to LRUs that operate as displays that operate to provide a user interface to certain of the data received by the display via the communications buses. The displays include a processing capability which allows for configuration of the information received via the communications buses, intended to provide the user with the data in an easy to understand format. However, as is the case with all electronic devices, a failure can occur rendering the display inoperable for its intended purpose. Displays are not the only devices in which failures can occur. Failures can occur in any of the LRUs in the system of systems described above.

Figure 1:
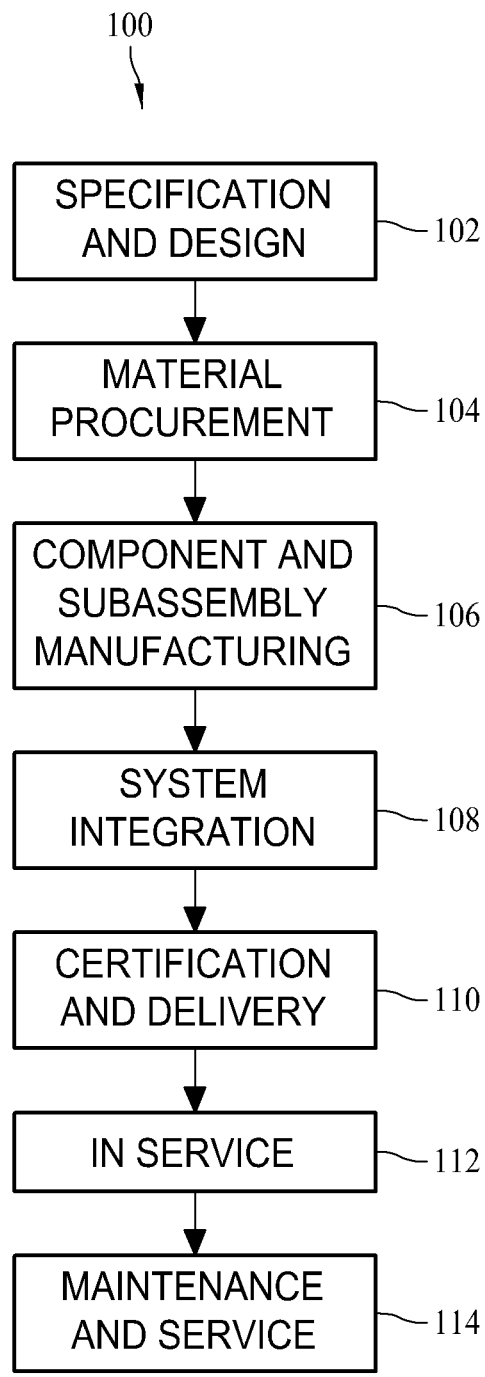
FIG. 1 is a flow diagram of an aircraft production and service methodology.
Figure 2:
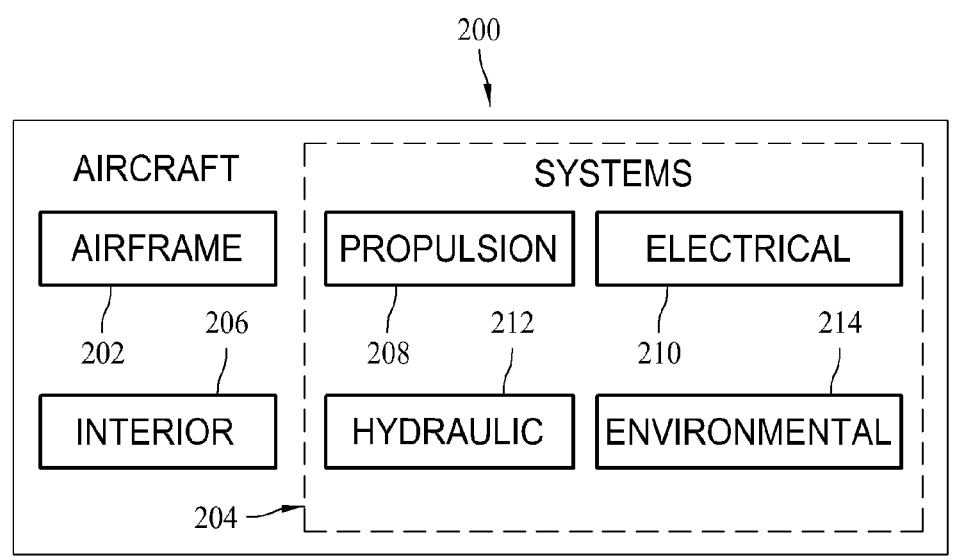
FIG. 2 is a block diagram of an aircraft.

By way of background, and referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place including the integration of many displays and other LRUs as described herein. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on) which from time to time includes replacement of faulty LRUs.

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on. Any one or multiple of these entities may be responsible for repair and/or replacement of LRUs within the platform.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example, and many of these systems are dedicated to a particular function, such as RADAR, and include one or more LRUs that are dedicated to performing the defined functions of the system, including communication of relevant data to other systems resident on a communications bus. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
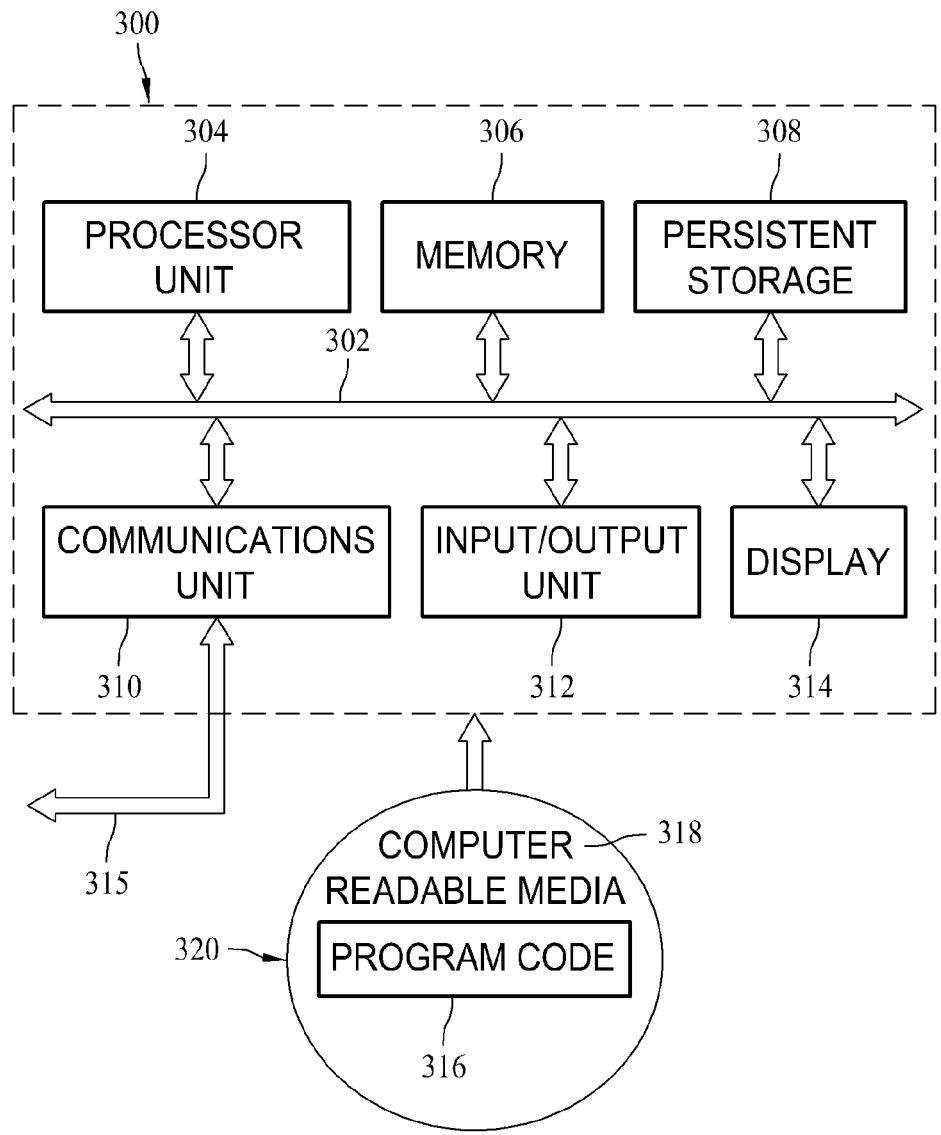
FIG. 3 is a diagram of a data processing system.

Turning now to FIG. 3, a diagram of a data processing system is depicted in accordance with an illustrative embodiment. The data processing system of FIG. 3 is but one example of a data processing system that might be deployed within a display or another LRU. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices via an interface to external systems. In the context of the present disclosure, communications unit 310 is an interface to one or more communications buses 315 on an aircraft as described elsewhere herein. Communications unit 310 may provide communications via communications buses 315 through the use of either or both physical and wireless communication links.

Input/output unit 312 allows for input and output of data with other devices that may be connected to data processing system 300. For example, without limitation, input/output unit 312 may provide a connection for user input through a user interface, including, but not limited to, a touch display, a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over communications bus 315 to persistent storage 308 from another device or data processing system for use within data processing system 300. For instance, program code stored in a computer readable storage medium may be downloaded to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

A bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described data processing system 300 is one example of a system operable for to provide the processing functions for a particular LRU. Now referring to FIG. 4, aircraft 200 includes a number of line-replaceable-units (LRUs) 400 passing data over a number of different avionics buses 402. As explained herein, each LRU 400 can include a module incorporating one or more processors for controlling and/or monitoring one or more components or subassemblies of aircraft 200. For simplicity, LRU 400 refers to any LRU shown in FIG. 4. References to specific LRUs in the following paragraphs utilize different reference numerals. It is understood that certain of the illustrated LRUs may be a LRU providing a display.

In this regard, each LRU 400 of the aircraft can be provided to monitor, control and/or display parameters relating to one or more external devices such as an actuator, valve, motor, etc., associated with a particular component or assembly of the aircraft. In addition, certain LRUs 400 generate output signals, for example, in the form of messages output onto avionics buses 402, which can be monitored to determine if the LRU 400 and/or the component with which it is associated is not properly operating. These LRUs also receive messages from the other LRUs. Specifically, each of the messages contains one or more bits of data that can be reviewed for the purpose of providing information as to the operation of the avionics and/or components coupled thereto.

The aircraft 200 can include any of a number of different LRUs 400 capable of communicating across one or more avionics buses 402. Each avionics bus, and thus the respective LRUs communicating thereon, can be configured to communicate in accordance with any of a number of different standards or protocols. In one typical embodiment, for example, a plurality of avionics buses can be configured in accordance with Mil-Std-1553, entitled: Military Standard Aircraft Internal Time Division Command/Response Multiplex Data Bus (with which its revisions and updates is incorporated by reference herein for all purposes). In such instances, as shown more particularly in FIG. 4, an example aircraft can include four flight control buses 410a-410d, two communication buses 420a, 420b, two mission buses 422a, 422b and a warning and caution system (WACS) bus 424. None, any, or all of the communications buses 402 can be Mil-std-1553, as other communications bus protocols are known. The example aircraft may incorporate buses in addition to the one shown in FIG. 4. An example of such a communications bus would be a Mil-std-1553 bus that provides communications related to displays, for example, communications between a display controller and a display. This document refers to the communications buses 402 as Mil-std-1553 buses for convenience only, and the disclosure should not be construed as limited to Mil-std-1553.

Figure 4:
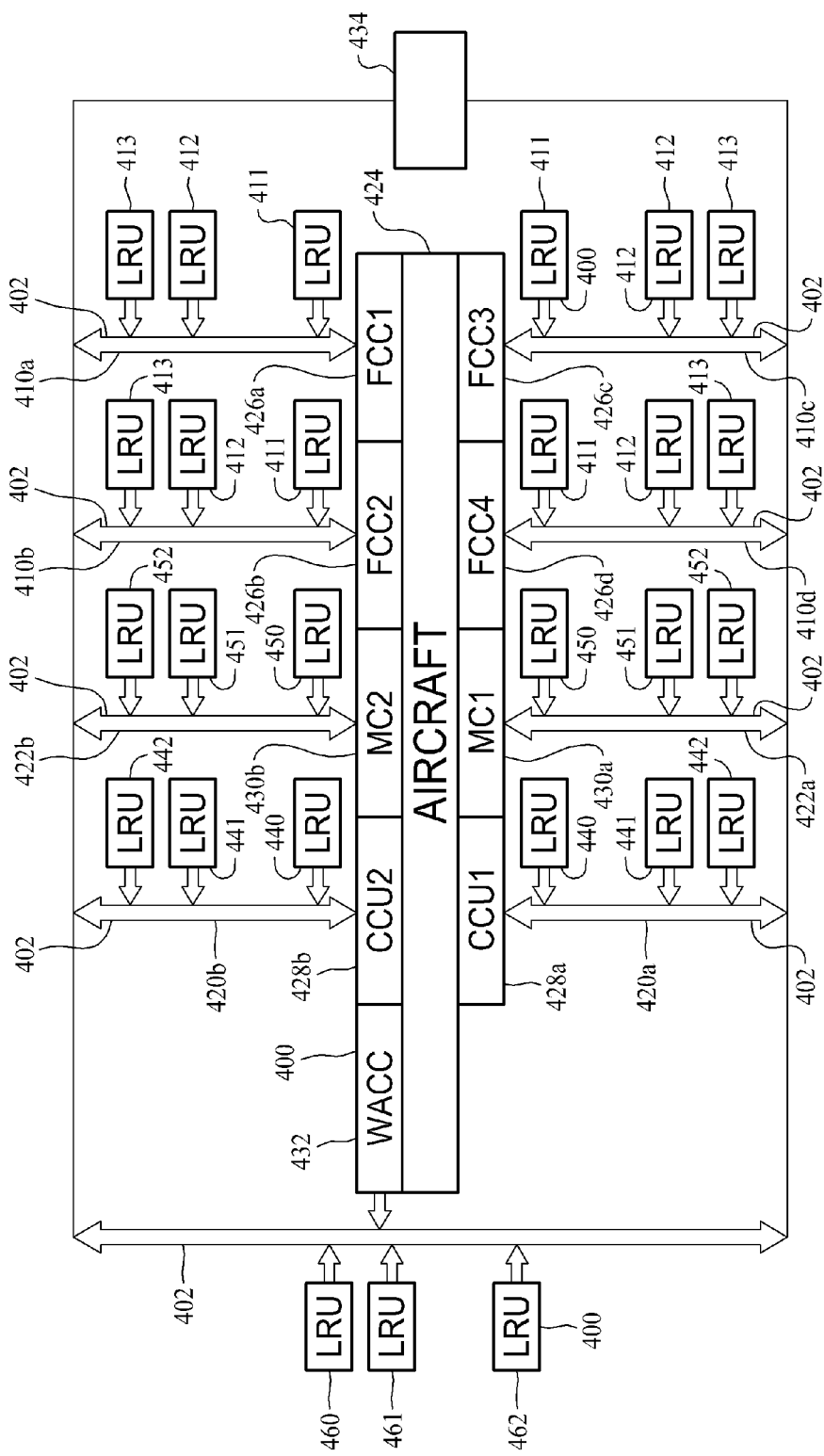
FIG. 4 is a diagram illustrating an aircraft configuration of multiple communications buses providing a communications capability for a multitude of line replaceable units.

Each Mil-Std-1553 bus 410a-410d, 420a, 420b, 422a, 422b, 424 of the aircraft 200, in turn, can include a primary and a secondary channel for transmitting signals between the various LRUs 400 and bus controller of the respective bus. In this regard, each of the LRUs 400 associated with each Mil-Std-1553 bus is considered one or both of a bus controller and a remote terminal. Certain of the LRUs 400 are understood to be operational as displays. A single avionics bus configured in accordance with Mil-Std-1553 may support up to thirty-one separate remote terminals. For example, as shown in FIG. 4, each flight control bus 410a-410d can have an associated flight control computer (FCC) 426a-426d and a number of LRUs 411, 412, 413. Each respective FCC, which is also considered an LRU, then, can control the LRUs associated with a respective flight control bus to thereby control the primary and secondary flight surfaces of the aircraft.

Also, for example, each communication bus 420a, 420b can have an associated communication control unit (CCU) 428a, 428b and a number of LRUs 440, 441, 442. The respective CCU's, which are also considered LRUs, can control the LRUs associated with the respective buses to control functions for the Integrated Radio Management System (IRMS), including radio, intercom and public address (PA) system control. Each mission bus 422a, 422b, for example, can have an associated mission computer (MC) 430a, 430b, often referred to as a core integrated processor (CIP), and considered an LRU. The MCs can control operation of a number of LRUs 450, 451, 452 associated with the respective mission buses to provide control, display and data processing for navigation system modes and sensor management navigation capability. The MCs can also provide four-dimensional (4D) guidance of the aircraft, thrust management and data for aircraft takeoff, landing, missed approach and engine-out conditions. Further, for example, the WACS bus 424 can include an LRU referred to as a warning and caution computer WACC 432 controlling operation of a number of LRUs 460, 461, 462 associated with the WACS bus. In addition, the WACC can convert aircraft status/failure signals for display on a warning annunciator panel (WAP). It is to be understood that the architecture of FIG. 4 is but one example aircraft architecture and that communications buses in addition to or instead of Mil-Std-1553 may be utilized.

As explained more fully below, to monitor the avionics buses 402 to test one or more of the LRUs of the aircraft 200, the system of one embodiment includes a monitoring unit 434 coupled to one or more of the avionics buses mentioned herein. The monitoring unit 434 is therefore capable of receiving data output from any or all of the LRUs associated with one or more avionics buses, and thereafter recording and/or transmitting at least a portion of the data to a user processor 436 for subsequent presentation, analysis or the like.

In contrast to conventional techniques for testing and monitoring LRUs 400 of an aircraft 12, the monitoring unit 434 is capable of monitoring the data output from all of the LRUs 400 associated with a greater plurality of avionics buses, such as all of the LRUs associated with the Mil-Std-1553 buses 402, 410a-410d, 420a, 420b, 422a, 422b, 424. Also in contrast to conventional techniques, if so desired, the monitoring unit 434 can be configured to identify events, such as faults, in the data output by the respective LRUs 400 that operates as a display. By identifying such faults, the monitoring unit 434 can selectively record and transmit data output from the LRUs 400, or filter out data output from the LRUs 400 that does not indicate an event of one or more LRUs 400. As such, the monitoring unit 434 can monitor and record data from LRUs 400 of the aircraft 200 without requiring an undesirable amount of memory resources, and as such, can transmit the recorded data without requiring an undesirable amount of time.

Figure 5:
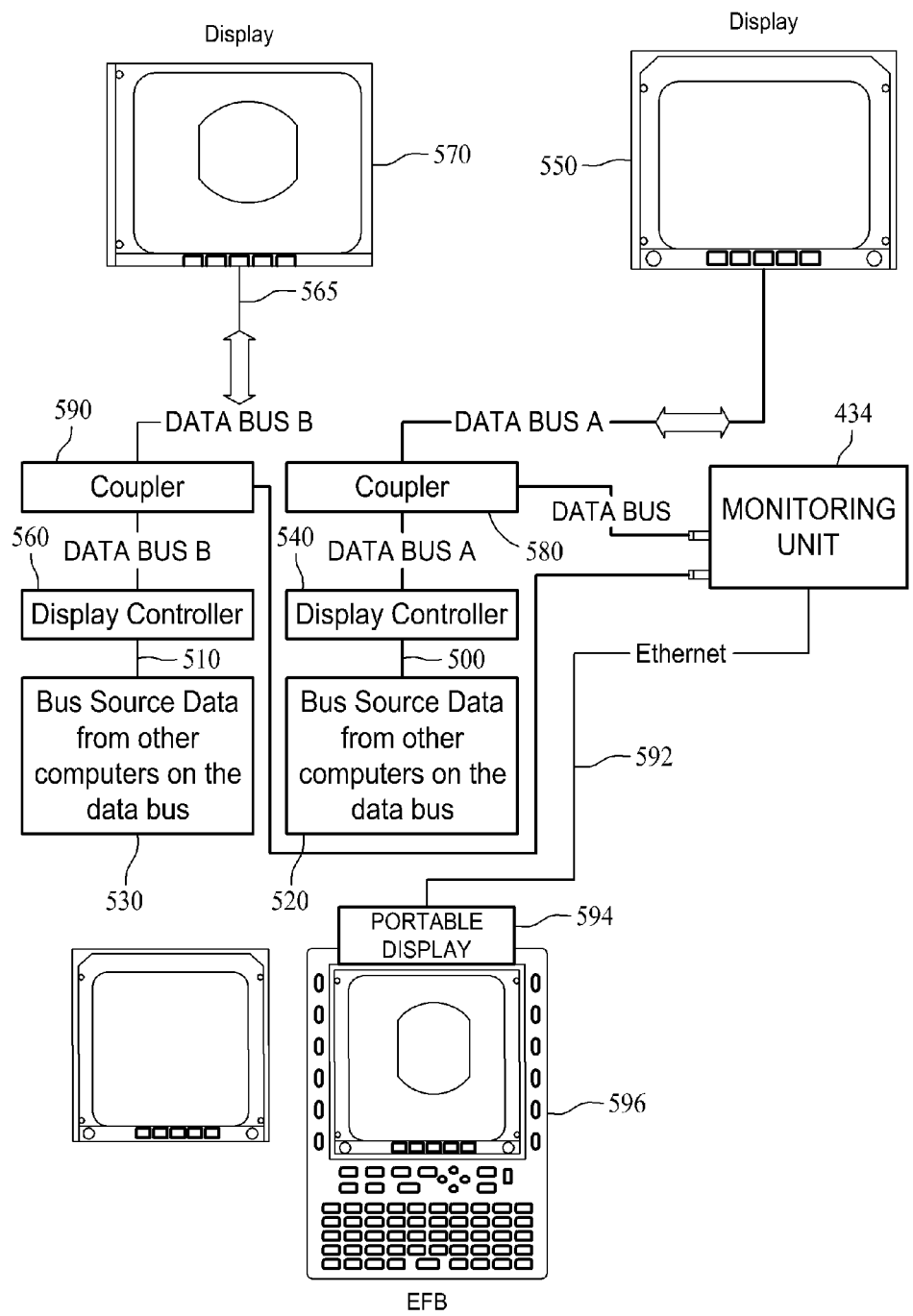
FIG. 5 is an illustrative example of various remote terminals including displays communicating on communications buses which are each coupled to a monitoring unit programmed to examine the data for the existence of a display failure.

The monitoring unit 434 can be further programmed to provide data to a display device upon determination that a primary display has failed. A simple example is introduced by FIG. 5. FIG. 5 illustrates communications that occur on two separate data buses, particularly first data bus 500 and second data bus 510. Bus source data 520 represents the data transmitted and received between a plurality of LRUs that communicate on first data bus 500 while bus source data 530 represents the data transmitted and received between a plurality of LRUs that communicate on the second data bus 510. Also transmitting and receiving on first data bus 500 is a display controller 540 which further communicates on data bus A 545 with display 550. Likewise, display controller 560 transmits and receives on second data bus 510 while also communicating across data bus B 565 with display 570.

As shown in FIG. 5, a coupling device 580 is placed on data bus A 545 and a coupling device 590 is placed on data bus B 565 which provides the monitoring unit 434 with all the messages that occur across these two data buses (data bus A 545 and data bus B 565). Coupling devices 580 and 590 essentially extend the respective data bus (data bus A 545 and data bus B 565) to the monitoring unit 434. In one embodiment, the monitoring unit 434 is programmed to determine, from analysis of the message traffic on the data bus A 545 and/or data bus B 565 if one or a plurality of display controller 540, display 550, display controller 560, and display 570 have failed.

As further described, once monitoring unit 434 determines that a display has failed, it will initiate a program therein which uses the message traffic destined for the failed display to be reconfigured and transmitted over a different bus (Ethernet bus 592 in FIG. 5) to a portable display 594, such as might be a portion of an electronic flight bag 596. The messages that occur on bus 592 are such that the display 594 is configured to have a look and feel that is similar, if not identical, to that of the failed display. Once monitoring unit 434 begins acting as a remote terminal on the bus, it emulates the communications of the failed remote terminal, specifically, transmitting its identity as that of the failed LRU on the data bus which the remote terminal communicates when not in a failed condition.

Summarizing, the monitoring unit 434 is operable to detect, for example, a failure bit in a message that is indicative of a failed display. The monitoring unit 434 then gathers the data, via the coupling to the data bus, that is being sent to the failed display, and emulates the failed display by sending the data meant for the failed display to a portable display and by responding to messages it receives on the data bus. Alternatively, in the case of a failed display controller, that previously communicated with the inoperative display (due to lack of messages from the failed controller, the monitoring unit 434 operates to gather the data that would have been processed by the failed controller. The monitoring unit 434 processes the gathered data in the same way as the failed display controller and transmits the data intended for the display to the portable display.

Figure 6:
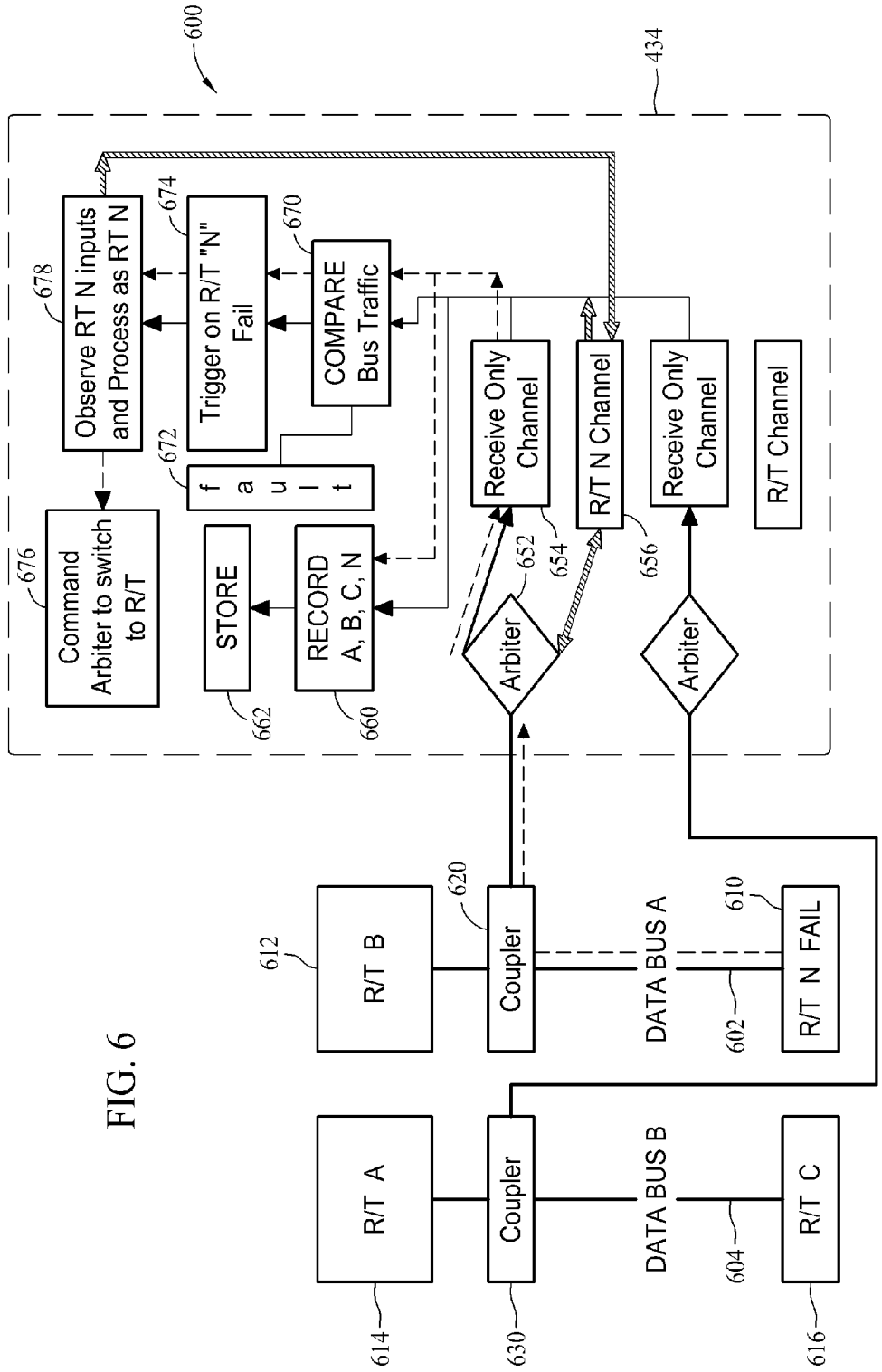
FIG. 6 is a data flow diagram illustrating operation of the monitoring unit with respect to a plurality of line replaceable units.

While the embodiment of FIG. 5 is limited to an application where a display and/or a display controller fails, the monitoring unit 434 is not so limited. FIG. 6 is a data flow diagram 600 illustrating operation of the monitoring unit 434, and further illustrating a capability for emulating one or more failed LRUs that reside on a data bus. More particularly, and relevant to several known data bus configurations, monitoring unit 434 is capable of determining when a particular LRU having a specific bus address is no longer communicating on the data bus. As described herein, monitoring unit 434 is configured to include the operational flight programs of multiple LRUs, and upon detecting an LRU failure, monitoring unit unit 434 assumes the identity of the failed LRU with respect to data bus communications.

Now referring specifically to FIG. 6, sometimes a remote terminal fails. The monitoring unit 434 is programmed to monitor the data on data buses A and B (602 and 604) to determine when an event occurs, such as, detecting the lack of proper parameter propagation from a failed LRU (N) 610 forming a portion of a system of LRUs including LRUs 612, 614 and 616, for example. The monitoring unit 434 is programmed to gather the data that is being sent to the failed LRU (N) 610 and process the data as LRU (N) 610 would have. Particularly, the monitoring unit 434 would then transmit the result onto data bus A 602 as would LRU (N) 610, the monitoring unit 434 indicating that its address it that which was assigned to LRU (N) 610.

In FIG. 6, the solid lines illustrate the communications paths within the monitoring unit 434 when all LRUs are operational. The monitoring unit 434 records and processes the message traffic received via the couplers 620 and 630 substantially simultaneously and without transmitting. The dashed lines illustrate the failure sense paths. Particularly, the data flow path when LRU (N) 610 fails and the lack of data is determined by the monitoring unit 434 on data bus A 602. In FIG. 6, data bus B 604 is still operating normally.

When the LRU (N) 610 failure is detected, the monitoring unit 434 commands an arbiter 652 to switch channels from a receive only channel 654 to a receive/transmit channel 656, and the data path to the receive only channel 654 is no longer used. The arbiter 652 then begins operations on the crosshatched communications path. The monitoring unit 434 still records and processes the rest of the message traffic that occurs on data bus A 602 but processes the data that would have been processed by the failed LRU as if the monitoring unit 434 was LRU N 610. Furthermore, the monitoring unit 434 transmits its identity on data bus A 602 as LRU N.

Referring again to data flow diagram 600, during non-failure operation, data from data bus A 602 is routed from the arbiter 652 though receive only channel 654 where it is recorded 660 and stored 662. In parallel, bus traffic is compared 670 to determine if a failure has occurred. If a fault 672 is detected, at the bus traffic comparison 670, fail trigger 674 occurs, which instructs the monitoring unit 434 to switch 676 the arbiter 652 to the receive/transmit channel 656 and observe 678 the inputs intended for the failed LRU as well as process the observed 628 inputs as if the monitoring unit 434 is the filed LRU.

The above described embodiments provide a back up system where the monitoring unit 434 monitors the various communications buses of the platform for data contained within various messages that indicate a failure condition related to one or more of the LRUs. The embodiment therefore allows the thousands of parameters handled by on-board buses to be monitored to provide a backup capability as a result of a failure event.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for providing a backup capability for a plurality of line-replaceable units (LRUs) communicatively coupled to a communications bus in an aircraft, wherein the plurality of LRUs include a plurality of different types of LRUs, and wherein each LRU is assigned a unique address on the communications bus, said method comprising:
   processing, with a monitoring unit, messages associated with the plurality of different types of LRUs;
   monitoring, with the monitoring unit, the messages associated with the plurality of different types of LRUs on the communications bus;
   identifying that at least one communicatively coupled LRU of a first type of the plurality of different types of LRUs has failed;
   configuring the monitoring unit, upon receiving the indication of a LRU failure, to assume the unique address associated with the at least one failed LRU, while processing the messages associated with the plurality of different types of LRUs;
   performing, within the monitoring unit, at least a portion of the functions of the at least one failed LRU in response to messages occurring on the communications bus that are addressed to the failed unit, while processing the messages associated with the plurality of different types of LRUs; and
   transmitting messages, from the monitoring unit to the communications bus, the messages including data generated by the performing of at least a portion of the functions of the at least one failed LRU by the monitoring unit.

2. The method according to claim 1 wherein, upon determining that the failed LRU is a display, said method further comprises transmitting data to a display that is not associated with the communications bus.

3. The method according to claim 2 wherein transmitting data to a display that is not associated with the communications bus comprises transmitting the data to an electronic flight bag for display.

4. The method according to claim 1 further comprising determining, upon receiving the indication of LRU failure, if the failed LRU is one or both of the primary display and a display controller associated with the primary display.

5. The method according to claim 1 wherein configuring the monitoring unit to assume the unique address associated with the failed LRU further comprises the monitoring unit identifying itself on the communications bus as the failed component.

6. The method according to claim 1 wherein, upon receiving an indication that the failed LRU is a display controller, said method comprises processing, with the monitoring unit, received data in the same manner as the data would be processed by an operational display controller.

7. The method according to claim 1 wherein monitoring messages on the communications bus for an indication that at least one of the communicatively coupled LRUs has failed comprises detecting a lack of proper parameter propagation from at least one LRU.

8. The method according to claim 1 wherein monitoring messages on the communications bus for an indication that at least one of the communicatively coupled LRUs has failed comprises:

commanding, upon determining a LRU has failed, an arbiter within the monitoring unit to switch from a receive only channel to a receive/transmit channel;

observing the messages intended for the failed LRU with the monitoring unit;

processing data received by the monitoring unit via the communications bus in the same manner as the data would be processed by the failed LRU prior to failure of the component; and transmitting at least an identifier, from the monitoring unit onto the communications bus, the identifier identifying the monitoring LRU as the failed component.

9. A monitoring unit for use in an aircraft, said monitoring unit comprising:

a first communications bus interface for receiving messages associated with a plurality of different types of aircraft line-replaceable units (LRUs) communicatively coupled to a first communications bus in an aircraft; and a processing device programmed to:

process the received messages associated with the plurality of different types of LRUs;

determine, from the received messages associated with the plurality of LRUs, whether one or more of the plurality of LRUs of a first type have failed, said processing device further programmed to:

configure the monitoring unit to assume the unique address associated with the failed LRU, while processing the received messages associated with the plurality of different types of LRUs;

perform at least a portion of the functions of the failed LRU in response to messages occurring on the first communications bus that are addressed to the failed LRU, while processing the received messages associated with the plurality of different types of LRUs; and cause messages to be transmitted by said monitoring unit onto the first communications bus via said first communications bus interface, the messages including data generated by the performing of at least a portion of the functions of the failed LRU by said monitoring unit.

10. The monitoring unit of claim 9 further comprising a second communications bus interface for communications with a device not having an address on the first communications bus.

11. The monitoring unit of claim 10 wherein said first communications bus interface and said second communications bus interface comprise different communications protocols.

12. The monitoring unit of claim 11 wherein said second communications bus interface comprises a communications protocol for communications with a display device.

13. The monitoring unit of claim 9 wherein said first communications bus interface comprises a coupling device operable to communicatively couple said monitoring unit to said first communications bus interface.

14. The monitoring unit of claim 9 wherein said processing device is programmed to determine, using data within the messages received at said first communications bus interface, if the failed LRU is one or both of the primary display and a display controller associated with the primary display.

15. The monitoring unit of claim 9 wherein said processing device is programmed to respond to messages received on said first communications bus interface, said monitoring unit programmed to identify itself on the communications bus associated with said first communications bus interface as the failed LRU.

16. The monitoring unit of claim 9 wherein said processing device is programmed to detect a lack of proper parameter propagation from at least one of the LRUs operating on the first communications bus to determine if one or more of the LRUs have failed.

17. The monitoring unit of claim 9 wherein upon determining that one or more of the LRUs associated with the first communications bus have failed, said processing device is programmed to:

command an arbiter within said monitoring unit to switch from a receive only channel to a receive/transmit channel;

observe the messages intended for the failed LRU on said first communications bus interface with said monitoring unit;

process data within the messages intended for the failed LRU on said first communications bus interface in the same manner as the data would be processed by the failed LRU prior to failure of the LRU; and transmit onto the first communications bus via said first communications bus interface at least an identifier identifying the monitoring unit as the failed LRU.

18. A monitoring unit for use in an aircraft, said monitoring unit comprising:

a first communications bus interface for receiving messages associated with a plurality of different types of aircraft line-replaceable units (LRUs) communicatively coupled to a first communications bus in an aircraft;

a processing device programmed to:

process the received messages associated with the plurality of different types of LRUs;

determine, from the received messages associated with the plurality of LRUs, whether one or more of the plurality of LRUs of a first type have failed; and a memory comprising operational programs stored therein, the operational programs associated with the plurality of different types of LRUs, said processing device further programmed to:

configure, upon determining a LRU has failed, the monitoring unit to assume the unique address associated with the failed LRU, while processing the received messages associated with the plurality of different types of LRUs; and execute an operational program associated with the failed LRU such that said monitoring unit performs at least a portion of the functions of the failed LRU, responds to messages occurring on the first communications bus that are addressed to the failed LRU while processing the received messages associated with the plurality of different types of LRUs, and cause messages to be transmitted by said monitoring unit onto the first communications bus via said first communications bus interface, the messages including data generated by the execution of the operational program associated with the failed LRU by said monitoring unit.

* * * * *